US007160526B2

(12) United States Patent
Lianzhen et al.

(10) Patent No.: US 7,160,526 B2
(45) Date of Patent: Jan. 9, 2007

(54) PROCESS FOR DETOXIFICATION OF CCA-TREATED WOOD

(76) Inventors: Lin Lianzhen, Haitusaipurisu B 311 Takano Kamitakeya-Cho 31 Sankyo-Ku 606-8105, Kyoto (JP); Chung-Yun Hse, 4101 Mayflower Blvd., Alexandria, LA (US) 71303; Todd Finley Shupe, 2833 Westerwood Dr., Baton Rouge, LA (US) 70816

( * ) Notice: Subject to any disclaimer, the term of this patent is extended or adjusted under 35 U.S.C. 154(b) by 616 days.

(21) Appl. No.: 10/434,529

(22) Filed: May 9, 2003

(65) Prior Publication Data

US 2004/0225173 A1 Nov. 11, 2004

(51) Int. Cl.
*C01G 3/00* (2006.01)
*C01G 37/00* (2006.01)
*C01G 28/00* (2006.01)

(52) U.S. Cl. ........................... 423/34; 423/55; 423/87; 588/315; 588/318; 588/412; 210/912; 210/913

(58) Field of Classification Search ............ 423/658.5, 423/34, 55, 87, DIG. 14; 588/315, 318, 588/412; 210/912, 913; 162/70–73, 76, 162/77
See application file for complete search history.

(56) References Cited

U.S. PATENT DOCUMENTS 5,415,847 A * 5/1995 Robinson ..................... 423/27
2003/0108462 A1* 6/2003 Oskoui ........................ 423/27
2004/0092782 A1* 5/2004 Catallo ........................ 585/16

* cited by examiner

*Primary Examiner*—Steven Bos
(74) *Attorney, Agent, or Firm*—Richard J. Hammond

(57) ABSTRACT

A chemical process for detoxifying spent CCA (copper, chrome, arsenic)—treated wood, from which CCA and detoxified wood are recovered for recycling comprising the steps of (a) treating CCA-treated wood in the presence of a liquefying reagent such as an organic solvent at 100–250° C. with or without ferrous ions to form liquefied CCA-treated wood (b) adding water or an aqueous solution of an organic solvent to the liquefied CCA-treated wood with stirring to obtain an aqueous solution of liquefied CCA-treated wood (c) adding complexing or precipitating agents, such as phosphoric acid or calcium hydroxide to the aqueous solution of step (b) thereby precipitating insoluble heavy metal complexes or precipitates and forming a solution of detoxified CCA-treated wood (d) separating said heavy metal complexes or precipitates from the solution of detoxified liquefied CCA-treated wood and (e) isolating chromated copper arsenate from said heavy metal complex or precipitate.

Further, the solvent may be removed from the solution of detoxified CCA-treated wood of step (d) to obtain concentrated liquefied detoxified CCA-treated wood. This concentrated material may be used as a phenolic or polyurethane intermediate.

Additionally, by adding a concentrated inorganic acid, such as sulfuric acid, nitric acid or phosphoric acid, to the complex or precipitated solids of step (d), chromated copper arsenate can be recovered for use in manufacturing additional CCA-treated wood.

12 Claims, No Drawings

PROCESS FOR DETOXIFICATION OF CCA-TREATED WOOD

FIELD OF THE INVENTION

The present invention relates to the recycling of CCA-treated wood products, including detoxification of CCA-treated wood, recycling of detoxified wood and recovered chromated copper arsenate.

BACKGROUND OF THE INVENTION

Preservative-treated wood products are well known to significantly prolong service life, and thereby extend the forest resource and enhance its sustainability. Inevitably, however, the treated products become unserviceable either due to mechanical damage or failure, biological deterioration, or obsolescence. It is estimated that about 5 million tons of spent preserved wood is disposed of annually into landfills in the Untied States, and the ratio of wood treated with chromated copper arsenate (CCA) is forecasted to increase significantly due to its use in housing and decking. These CCA-treated posts and sleepers have an average working life of approximately 25 years, therefore the release of CCA-treated wood products is expected to increase continuously over the next decades.

Disposal of the spent CCA-treated wood has become a major concern because of its residual toxic CCA content, in particular the arsenic and chrome. Conventional waste disposal options for spent preserved wood, such as burning and landfilling, are becoming more and more costly or even impractical because of increasingly strict regulatory requirements. The burning of treated wood may be extremely dangerous and even more so when the wood has been treated with CCA and this not only in respect to the possible environmental pollution but also where public health is concerned. Studies have shown that burning of the preservative-treated wood waste emits highly toxic smoke and fumes in the environment. In the case of landfills, it is necessary to remove the preservatives in order to meet the landfill regulations. For example, studies have shown that CCA compounds can be gradually leached out in aquatic environments, for example by rain water. Moreover, it also causes the concern of space requirements.

Spent preservative-treated wood products are a potential recycling resource for the production of energy. Additionally, materials having additional value may be produced from these recycled materials. Wood-preservatives may also be recovered in the recycle operation. Thus, both removal of the toxic preservatives from the preservative-treated wood and recycling of the detoxified preserved wood are of great importance to those concerned with the life cycle management of treated wood.

The recycling of CCA-treated wood products is presently undertaken to a very limited degree due to the difficulty in complying with environmental protection requirements and regulations as well as for economic reasons.

One of the recycling options for preserved wood is composite manufacturing. However, preservative interference with fiber/adhesive bonding and the volatile properties of the preservative components at the high temperature can cause processing and industrial hygiene problems. Further research and development are needed before this recycling option is adapted in commercial production. Moreover, the presence of toxic preservatives in the composite greatly limits the application area of the composite and this also produces obstacles to the commercial application of this recycling option.

Numerous studies and experiments have been carried out on combustion of the preservative-treated wood products. It was found that burning the preserved-wood, particularly that treated with CCA, in traditional incinerators is not possible because it emits highly toxic smoke and fumes. Most of arsenic contained in the CCA-treated wood evaporates and takes with it other heavy metals because of the thermal shock between ambient air and incinerator temperature. Above 450° C., arsenic trioxide particulate matter, produced in the incineration process, becomes extremely fine. It is difficult to trap except by using very expensive methods to capture and wash the arsenic trioxide containing smoke. Recently, a new combustion system has been prepared which is a vertically disposed reactor column, containing two sections. The lower sector of the reactor column is for heating the wood chips to about 400° C. (below the ignition point of the wood chips) by introducing hot gases having a low oxygen content. The upper section of the reactor column is continuously filled with humidified wood chips to progressively cool the gases to a temperature below the condensation temperature of the gases (about 65° C.) and deposit condensed particulates in the form of heavy metals on the wood chips. This process enable the control and blocking of arsenic vapor arising from the combustion of wood treated with CCA. However, this process is an energy-intensive one, having a low processing speed. Its economic effectiveness is dubious.

Conventional pyrolysis systems (fixed bed, batch or grate; fluidized bed; rotary kiln, etc.) operate at too high temperature to prevent the emission of metal vapors. Percentages of arsenic volatilized have been reported to range between 8 and 95%, even though, the amounts of copper and chromium volatilized are found to be much lower than that of arsenic. A low-temperature (300–450° C.) pyrolysis system for the CCA-treated wood is reported to be effective in decreasing the release of arsenic during the pyrolysis of CCA-treated wood. This improved pyrolysis process has not proven to be economically viable.

Based on the consideration of environmental issues and associated restrictions, recently many attempts have been made to remove CCA from the CCA-treated wood by using solvent extraction, biological remediation and the like.

The solvent extraction of preservatives from spent treated wood is to solvate or dissolve the preservatives, removing them from the wood to the level compatible with the succeeding treatment or utilization processes, such as combustion, composite manufacturing, biodegradation processes and the like. The extraction process may be effective for high CCA concentrations. However, among the disadvantages of this recycling method are the huge amount of chemical solvents used, the long duration of the process, and the problems associated with handling and recycling of resulting extraction solution containing the toxic CCA components. Recently it is reported in a Japanese patent that over 90% of the copper, chromium and arsenic can be extracted out from the spent CCA-treated wood by supper critical carbon dioxide. Compared with the common solvent extraction, this technique has a shorter duration and high removal ratios of copper, chromium and arsenic but requires less solvent. However, it is still in a lab-scale and its economic effectiveness and possible treatment scale are not clear.

With a biological approach, there are some encouraging results in using both fungi and bacteria to release copper, chromium and arsenic from the treated wood. However microbiological separation is still at an early stage and offers no industrial application to solve the problem at hand. The main disadvantages of biological degradation are the inability of many organisms to tolerate or metabolize wood that contains high preservative concentrations. Therefore, a preliminary preservatives extraction process is needed for treated wood with a high concentration of preservatives. Moreover, the biological approach takes a long time to digest preservatives, and the economics of the whole process require much more attention.

The above review of the prior art indicates that up to now almost all the effort of recycling CCA-treated wood have been focused on treatments for environmentally safe disposal. However, recycling of the treated wood and the recovery of chromated copper arsenate has been largely ignored. As mentioned above, huge amount of preserved wood are removed from service annually. It would be very important if there were an economically effective process wherein both CCA and wood can be recovered respectively for recycling. Based on this consideration, recently, we have developed a novel process for the recycling of the spent CCA-treated wood. By this process, chromated copper arsenate is recovered for recycling and the detoxified wood can be used as bio-based chemicals for preparation of resin or plastics.

The process of the present invention comprises four steps: liquefaction of CCA-treated wood; separation of chromated copper arsenate from the liquefied wood solution; utilization of detoxified liquefied wood to polymeric materials; and regeneration of chromated copper arsenate.

In the process, CCA-treated wood is first liquefied in the presence of aliphatic or aromatic hydroxyl-containing substances, such as polyhydroxy alcohols or phenols, and some CCA recovering-enhancing additives, such as ferrous salts at a temperature of 100–170° C. with acidic catalyst or at elevated temperatures of 200–250° C. without catalyst. Aliphatic hydroxyl-containing substances also include polyether polyols, polyester polyols and mixtures thereof as well as the above-noted polyhydroxy substances in the step (a) liquefaction of CCA treated wood. An illustrative aliphatic hydroxy-containing substance is a mixture of glycerol and polyethylene glycol having a molecular weight from about 200 to about 1500. The amount of glycerol in the mixture of glycerol and polyethylene glycol is from about 2% to about 50% by weight. Additionally, the aliphatic hydroxy-containing substance may be a mixture of ethylene glycol and polyethylene glycol having a molecular weight from about 200 to about 1500. The amount of glycerol in the mixture of ethylene glycol and polyethylene glycol is from about 2% to about 50% by weight. A cyclic ester my also be added to the aliphatic hydroxyl-containing substance in such liquefaction step (a). This treatment converts the spent wood into a thick liquid with molecular weights ranging from several hundreds to several thousands. As a second step, the liquefied wood is diluted with water or aqueous organic solvent to form a solution for easier processing. To this solution, precipitants or complexing agents for the hazardous elements chromium, copper and arsenic, (sometimes referred to herein as "heavy metals") such as calcium hydroxide or phosphoric acid (in the ease where it was not used in the liquefaction) are added and the solution is agitated and then allowed to sedimentation. The sediment, which contains the heavy metals copper, chromium and arsenic, is then separated from the solution by centrifugation or filtration. By this process, more than 95% of the copper, chromium and arsenic are removed from the liquefied CCA-treated wood solution. A detoxified liquefied CCA-treated wood solution is therefore produced. As a third step, the detoxified liquefied CCA-treated wood solution is then concentrated to remove the diluting solvent and the resulting concentrated detoxified liquefied CCA-treated wood solution is used as a bio-based raw matenals for the preparation of polymer materials, such as polyurethanes and phenoiic resins. The diluting solvent recovered can be reused in the process without further treatment. Finally, the sediment containing chromium, copper and arsenic is treated with concentrated inorganic acid such as sulfuric, nitric or phosphoric acid to regenerate the chromated copper arsenate, which may be reused in the preservation industries of wood.

Since the process uses relative low temperature, short reaction time, and relatively small amount of organic reagents, it is an effective and economically feasible technique for recycling of spent CCA-treated wood.

SUMMARY OF THE INVENTION

In the process, CCA-treated wood, which is crushed or ground into chip or powder, is first liquefied in the presence of a liquefying reagent and other optional additives at an elevated temperature. This liquefaction part of the process can be greatly accelerated by using a strong acid as the catalyst to carry out the liquefaction. The liquefying reagent suitable for the liquefaction can be selected based on the recycling purpose of the detoxified CCA wood. With this process, the CCA-treated wood is converted into a liquid material with an average molecular weight ranging from several hundred to several thousand. The liquefied CCA-treated wood is then diluted with water or an aqueous organic solvent to form an aqueous solution of liquefied CCA-treated wood so that it may be processed in the next step. In such next step, the hazardous elements, chromium, copper and arsenic in the aqueous solution of liquefied CCA-treated wood are separated through precipitation or by complexation by addition of certain complexing and/or precipitation agents such as phosphoric acid and calcium hydroxide. The presence of ferrous ions or phosphoric acid in this part of the process effectively enhances the removal of the water-soluble heavy metal ions or their chelates. This technique allows the removal of copper, chromium and arsenic to reach 99.8%, 99.3% and 98.9%, respectively. The remaining solution, a detoxified CCA-treated wood solution, is then concentrated and used as bio-based raw materials that are compatible to the petrochemical-derived raw materials used for polymer products, such as polyurethane foams and phenolic resins. The diluting solvent recovered from the concentration step can be reused in the process without further treatment. The heavy metal precipitants or complexes that were previously separated (as a sediment) can be converted mainly to chromated copper arsenate by adding a concentrated inorganic acid such as sulfuric acid, phosphoric acid or nitric acid. This material may then be reused to produce more CCA-treated wood. Since this process uses relative low temperature, short reaction time, and relatively small amount of organic reagents, it is an effective and economically feasible technique for recycling of spent CCA-treated wood

DETAILED DESCRIPTION OF THE PREFERRED EMBODIMENTS

The present invention relates to a process for separating chromated copper arsenate (CCA) from spent CCA-treated wood. Copper, chromium and arsenic compounds as well as a detoxified wood product are recovered for recycling. The process of the present invention differs from the prior art in (a) the present invention covers not only the separation of CCA from wood but also the recycling of both CCA and a detoxified wood product that results from the process; (b) the process is based on both techniques of wood liquefaction and wastewater treatment which are well developed with sound reliability and therefore offers numerous technical options for the improvements of the constituting processes in both the technique and processing equipment; (c) the liquefaction temperature is much lower than the releasing point of arsenic and the process is easily controlled. Therefore there is no risk for the release of the toxic substances in the process; (d) CCA is regenerated for recycling and a detoxified wood product is directly used as bio-based energy or chemical raw material; (e) the cycling is short and quick, and therefore, the technique is economically effective. The process of the present invention is suitable for various CCA-treated wood products with different CCA compositions and concentrations. These include low CCA-content treated wood and high CCA-content treated wood.

In the process of the present invention, it is preferred that the spent CCA-treated wood (the CCA-treated wood that is destined for disposal) is first crushed or ground into chip or powder to make it easier to process. The size of the crushed material, the chip or powder is not critical but should depend on the processing method and apparatus. Usually for easier handling the size of passing a number twenty sieve is preferable. However, it should be noted that the process of the present invention may use the spent CCA-treated wood as received, without any prior crushing or grinding.

In step (a) of the process of the present invention, liquefaction of CCA-treated wood is carried out. In this step, CCA-treated wood is mixed with at least one liquefying reagent to obtain a mixture of CCA-treated wood and the reagent. The mixture is then subjected to heating. The preferred temperature of heating is from about 50 degrees to about 400 degrees C., most preferably from about 100 to 250 degrees C. for a time sufficient to convert the wood into a thick liquid e.g., about 5 to about 500 minutes, preferably from about 20 to about 180 minutes. The material formed from such heating is an aqueous solution of liquefied CCA-treated wood.

The liquefying reagent used to carry out step (a) is water used in the presence of a strong acid. The acid greatly accelerates liquefaction and allows the liquefaction process to proceed at a lower temperature range, that is, the range of 100 to 180 degree C. The types of strong acid used to catalyze this step (a) process are not critical. Such acid may be selected from mineral acids, strong organic acids, Lewis acids or mixtures thereof. Sulfuric acid and phosphoric acid are preferable due to their effectiveness and low cost. The amount of acid used to catalyze the liquefaction process of step (a) is typically in the range from 0.1% to 20% by weight based on the weight of CCA-treated wood. The total amount of liquefaction reagent used is from about 20% to 5 times of the weight of the CCA-treated wood. An amount of reagent lower than 20% may results in insufficient liquefaction of the CCA-treated wood. Larger amount of reagent, i.e., over 5 times of the wood, gives better liquefaction but is not desirable in the view of economic effectiveness.

Any conventional mixing apparatus or equipment is suitable for this reaction step. However, in case the boiling point of the liquefying reagent used is near to or lower than the liquefaction temperature, an autoclave apparatus must be used. Otherwise a reaction system equipped with a reflux condenser, which feed back the condensates to the reaction apparatus, is preferable. The condensate mainly consists of water, liquefaction reagents and a minor portion of the decomposition products of wood. However, such condensate does not contain any of the hazardous heavy metals present in the CCA-treated wood. By this liquefaction process, more than 90% of the original CCA-treated wood is converted into a liquid form for an effective recovering of chromated copper arsenate and the recycling of wood.

The major components of the CCA-treated wood include; CrAsO4-lignin complexes, CuCrO4-lignin complexes, Cu+2-lignin and Cu+2-cellulose complexes, and Cr2 (OH) 4CrO4 precipitates. During the liquefaction step (a), the wood components are decomposed and these heavy metals complexes are released from the decomposed lignin and cellulose. To the substances that are insoluble in water or in aqueous solvents, such as $CrAsO_4$ or its chelates, separation may be effected simply by sedimentation and filtration. The water-soluble metal ions, such as Cu (II) and Cr (III), can be rendered insoluble (as heavy metal hydroxides) by adjusting the pH of the solution to alkaline with a metal hydroxide. However, in the case of the water-soluble heavy metals, especially Cu (II) bound to an organic chelate complexing agent, the addition of a metal hydroxide can not release them from the organic chelate complex and make it precipitate because of their strong affinity to the organic chelate. Therefore, in such cases the recovery of the heavy metal is not satisfactory in the above precipitation process. As such, in the process of this invention, the recovery of heavy metals is greatly enhanced by the addition of ferrous ions to the aqueous solution of liquefied CCA-treated wood formed in step (a). In accordance with the method of this invention, ferrous ions are utilized to replace the heavy metals which are in the form of complexes or chelates to free the heavy metal and to reduce Cr (VI) into Cr (III) in order to make these heavy metals easier to precipitate (the precipitation step of this process is subsequently carried out in step (c)) as an insoluble hydroxide or complex in accordance with the following Equations.

$$CrAsO_4\text{-lignin complexes}\rightarrow(\text{liquefaction})\rightarrow CrAsC_4\text{-organic chelants}+CrAsO_4\downarrow$$

$$Fe^{+2}+CrAsO_4\text{-organic chelants}\rightarrow Fe\text{-organic chelants}+CrAsO_4\downarrow$$

$$CuCrO_4\text{-organic chelants}+Fe^{+2}\rightarrow Cr\ (III)+CU^{+2}+Fe^{+2}\text{-organic chelants}$$

$$Cu^{+2}\text{-organic chelants}+Fe^{+2}\rightarrow Fe^{+2}\text{-organic chelants}+Cu^{+2}$$

$$Cu^{+2}+Fe^{+2}\rightarrow Cu^{0}\downarrow+Fe^{+3}$$

$$Cu^{+2}+OH^{-}\rightarrow Cu\ (OH)_2\downarrow$$

$$Cr\ (III)+OH^{-}\rightarrow Cr\ (OH)_3\downarrow$$

The preferable amount of ferrous ions used in this step is in the range of 1 to 6 molar ratio to the total heavy metal ions.

Instead of ferrous ions, phosphoric acid is also effective for enhancing the recovery of heavy metals. It reacts with heavy metals, producing insoluble metal phosphates, as illustrated in the following equations.

$$Cu+2\text{-organic chelants}+H_4PO_4\rightarrow Cu_3(PO_4)_2\downarrow+\text{organic matters}$$

$$Cr\ (III)+H_3PO_4\rightarrow CrPO_4\downarrow+H2O$$

$$As\ (V)+H_3PO_4\rightarrow As_3(PO_4)_5\downarrow$$

As the second step, step (b), of this invention, the liquefied CCA-treated wood is diluted with water or an organic solvent to make an aqueous solution easy for preparation and separation of the heavy metals. The complexing and precipitation reaction of the heavy metal ions (in subsequent step (c)) are basically ion reactions and therefore water or aqueous solvents are preferable. The composition of such a solvent depends on the kind of the reagent used in the liquefaction step (a). As such, aqueous solutions of methanol or acetone are found to be practical for this purpose. Where organic solvents are used in this step (b), the ratio of organic solvent to water should be adjusted to allow all the liquefied CCA-treated wood of step (a) to dissolve. Preferably the content of liquefied CCA-treated wood in the solution should not be greater than 50%. After carrying out this step (b), an aqueous solution of CCA-treated wood is formed which comprises liquefied wood and part of heavy metals dissolved in the aqueous solvent.

Addition of a metal hydroxide precipitating agent in the next step (c) will render the toxic metals insoluble. Various metal hydroxides can be used, however, it is preferable to use calcium hydroxide. The metal hydroxide precipitates also act as a co-precipitant to speed up the sedimentation of precipitate particles. The amount of metal hydroxide should be great enough to adjust the pH to 6–10 in the case where ferrous ions are present in the treatment system. In the case where phosphoric acid is present in the treatment system, a pH of 8–11 is preferred.

Complexing agents or flocculants can also be added in this step to increase the recovery and accelerate the precipitation and make the precipitates easy to deal with. Iron (II) sulfate, iron (II) chloride, phosphoric acid or any effective commercial complexing agent or flocculent can be used for this purpose.

After addition of the metal hydroxide is complete, the mixture is allowed to stir for 10 minutes to 24 hours, preferably about 60 minutes to 6 hours before proceeding to the next step, step (d). The addition of a metal hydroxide has several beneficial effects, including: excess sulfuric acid and phosphoric acid used in the previous steps will now be precipitated as calcium sulfate and calcium phosphate; adjusting the pH of the supernatant suitable for the precipitation of complexes; and allowing the free heavy metal ions to precipitate as metal hydroxides. If ferrous ions or phosphoric acid are not added in this step (c), it is preferable to add either of them prior to the addition of metal hydroxide.

After the complexion and precipitation are complete, the supernatant is subjected to filtration or centrifugation to separate the CCA-bearing solids (the heavy metal precipitants or complexes) from the solution of detoxified CCA-treated wood. This is step (d) of the process of the present invention.

The next step, step (e) is isolation of the separated precipitated chromium, copper and arsenic-bearing solids by mixing them with concentrated sulfuric acid or phosphoric acid. For this step, 96% to 98% industrial sulfuric acid is preferred. However, 85% phosphoric acid can replace the concentrated sulfuric acid. The acid to solid ratio is about 2 to 1 by weight. The resultant mixture is maintained at ambient temperature with stirring occasionally. The treatment time is about 10 minutes to 20 hours, preferably 1 to 3 hours. In this step (e), most of chromated copper arsenate is leached out. The organic residues consist of the unliquefied wood residues and some organic matter resulting from the co-precipitation or chelation with metal ions, which have become partially decomposed.

In a further embodiment of the present invention, water is added to the above mixture formed in step (e), preferably at a ratio of one-to-one by volume. The resultant mixture is subjected to a centrifuge or filtration to separate into liquids and solids. The liquids are the mixture of CCA and acid that can be used in the normal CCA wood treatment industrials. The solids are placed into a heated digester equipped with an air or water-cooled condenser followed by addition of concentrated sulfuric acid and nitric acid. The ratio of nitric acid to sulfuric acid to solid is approximately six to two to one by volume. Nitric acid is added to completely oxidize all organic matter in the solids, and sulfuric acid serves as a dehydrating agent and liquid media for CCA. The treatment temperature in the digester is preferably in the between 70 to 110 degrees C. The treatment time is dependant on volume and mass of organic matter to be oxidized. The nitric acid fumes evolved are fumed off and cooled in an air or water-cooled condenser and recovered for reuse in the process. After the digestion is completed, water is added to digester until the ratio of sulfuric acid to water reaches two-to-one. The diluted mixture is mixed and then undergoes separation into solids and liquids. Liquid containing CCA is recycled. Solid is washed and the water and solid are separated, the resultant liquid is returned to the digester. The content of CCA in the remaining solid is then chemically determined. If the solid still contain CCA, they may be recycled back to the above treatment process. The detoxified CCA-treated wood solid is ready for disposal.

As a further embodiment of the present invention, the solution of detoxified CCA-treated wood is subjected to additional processing. First, all of the diluting solvent from the solution of detoxified CCA-treated wood (step (c) ) is removed to obtain a concentrated liquefied wood, which is accomplished by evaporation. The concentrated liquefied wood is used as a precursor for production of bio-based energy and as intermediates for products such as polyurethane foam and phenolic resin.

The following examples are merely illustrative and are not to be construed as limiting the application of the present invention:

EXAMPLES

Example 1

This test was conducted to determine the liquefaction rate of spent CCA-treated wood. 100 g CCA-treated wood, 300 g of PEG#400/glycerin (2/1, w/w) 9 g of $H_2SO_4$ were weighed into an 1000 mL autoclave and shut, followed by heating at 150° C. for 120 min under stirring. After the desired reaction time, the liquefaction mixture was removed from the autoclave and cooled to ambient temperature 10 gram of the resultant liquefied wood was dissolved in 150 mL acetone/water (4/1.2, v/v) with stirring and then the solution was filtrated through a glass fiber filter (0.45 Cm), followed by washing until the filtrate was clear. The residue remained on the filter was dried in an oven of 100° C. to a constant weight. The unliquefied residue was calculated according to the following equation:

$$\text{Residue (\%)}=W_t/W_w\times W_r/W_s\times 100\%$$

Where $W_t$ is the total weight of the liquefaction ingredients, $W_w$ the weight of CCA-treated wood used in the liquefaction, $W_r$ is the weight of residue and $W_r$ the weight of sample used in the measurement. The unliquefied residue was used as a factor to estimate the liquefaction rate of wood. As a result, under the above liquefaction conditions, the unliquefied residue was 0.54%, indicating the spent CCA-treated wood could be liquefied smoothly in such a mild reaction condition.

Example 2

This test was designed to determine the influence of ferrous sulfate on the liquefaction rate. The experiment was carried out by the same procedure and same conditions as mentioned in Example 1 except for the addition of 20 g of $FeSO_4.7H_2O$, that is, the liquefaction mixture contained 100 g CCA-treated wood, 300 g of PEG#400/glycerin (2/1, w/w), 9 g of $H_2$ $SO_4$ and 20 g of $FeSO_4.7H_2O$, As a result, the unliquefied resident was 5.)%, indicating that the present of ferrous salt lightly decrease the liquefaction rate, but such a residue is not enough to affect the following separation treatment.

Example 3

This test was designed to determine the influence of ferrous chloride on the liquefaction rate. The experiment was carried out by the same procedure and under the same conditions as mentioned in Example 1 except for the addition of 15 g $FeCl_2.4H_2O$, that is, the liquefaction mixture contained 100 g CCA-treated wood, 300 g of PEG#400/glycerin (2/1, w/w), 9 g of $H_2SO_4$ and 15 g of $FeCl_3$.4H2O. As a result, the unliquefied residue was 9.5%, indicating that the present of ferrous salt lightly decrease the liquefaction rate, but such a residue is not enough to affect the following separation treatment Example 4

This experiment was carried our to determine the effect of phosphoric avid on the liquefaction rate. The experiment was carried out by the same procedure and same conditions a mentioned in Example 1 except for that the liquefaction mixture was changed as: 100 g CCA-treated wood, 300 g of PEG#400/glycerin (2/1, w/w), 6 g of $H_2SO_4$ and 3 g of phosphoric acid. As a result, the unliquefied residue was 0.95% indicating that the addition of phosphoric acid can improve the liquefaction rate.

Example 5

This experiment was performed to remove chromated copper arsenate from the liquefied wood obtained in Example 1. To 50 g of the liquefied wood mixture obtained in Example 1 was added to 400 mL of acetone/distilled water (4/1.2) to dilute the liquefied wood to make it easier to process, after which about 3 g of Ca $(OH)_2$ was added with stirring to precipitate the heavy metals. Stirring was continued for more than 6 hours and then the mixture was centrifuged (6000 rpm, 6842 g) to separate into solids and liquids. The CCA-bearing solid is dried in an oven at 50° C. for 8 hours followed by dried at 100° C. until it become constant, and then the weight was measured and recorded The obtained solid was digested, followed by analysis of 1CP. As a result, Cu 28.2%, Cr 79.4% and As 76.0% were separated from the liquefied wood Example 6

This test was designated to determine the influence of ferrous sulfate on the removal rate of chromated copper arsenate. 50 g of liquefied wood obtained in Example 2 was treated in the same way as mentioned in Example 5. As a result, Cu 99.8%, Cr 99.3% and As 98.9% were removed from the liquefied wood of Example 2, indicating that the presence of ferrous sulfate greatly improve the removal of chromated copper arsenate.

Example 7

This test was designated to determine the influence of ferrous chloride on the removal rate of chromated cooper arsenate 50 g of liquefied wood obtained in Example 3 was treated in the same way as mentioned in Example 5. As a result, Cu 80.0%, Cr 95.0% and As 90.5% were removed from the liquefied wood of Example 3, indicating that the presence of ferrous sulfate obviously improve the removal of chromated copper arsenate.

Example 8

This test designated to determine the influence of phosphoric acid on the removal rate chromated copper arsenate 50 g of liquefied wood obtained in Example 4 was treated in the same way as mentioned in Example 5, As a result, Cu 93.68%, Cr 100% and As 99.0% were removed from the liquefied wood of Example 3, indicating that the presence of phosphoric acid constantly improve the removal of chromated copper arsenate.

Example 9

This experiment was performed to determine the influence of the post-addition of phosphoric acid on the removal rate of chromated copper arsenate. To 50 g of the liquefied wood obtained in Example 1 was added to 400 mL of acetone/distilled water (4/1.2) to dilute the liquefied wood to make it easier to process, after which 3.3 g of concentrated (85%) phosphoric acid was added with stirring. Stirring is continued for 30 minutes after the addition of phosphoric acid, followed by the addition of 4.5 g of $Ca(OH)_2$ to precipitate the heavy metals. Stirring was continued for another 4 hours and then the mixture was centrifuged (3000 rpm, 6842 g) to separate into solid part and liquid part. The CCA-bearing solid part is dried in an oven at 50° C. for 8 hours followed by dried at 100° C. until it become constant, and then the weight was measured and recorded. The obtained solid was digested, followed by analysis of 1CP. As a result, Cu 83.0%, Cr 87.8% and As 98.9% were separated from the liquefied wood, indicating that the post addition of phosphoric acid can also improve the removal of chromated copper arsenate.

Example 10

This experiment was performed to determine the influence of the post-addition of ferrous ions on the removal rate of chromated copper arsenate. To 50 g of the liquefied wood obtained in Example 1 was added to 400 mL of acetone/distilled water (4/1.2) to dilute the liquefied wood to make it easier to process, after which 2.5 g $FeSO_4.7H_2$ was added with stirring. Stirring is continued 30 minutes after addition of $FeSO_4.7H_2O$, followed by the addition of 3 g of $Ca(OH)_2$ to precipitate the heavy metals. Stirring was continued for another 4 hours and then the mixture was centrifuged (6000 rpm, 6842 grams) to separate into solid part and liquid part. The COCA-bearing residue solid part is dried in an oven at 50° C. For 8 hours followed by dried at 100° C. until it become constant, and then the weight was measured and recorded. The obtained solid was digested, followed by analysis of 1CP. As a result, Cu 32.60%, Cr 85.0% and As 87.3% were separated from the liquefied wood, indicating that the post-addition of ferrous ions can also improve the removal of chromated copper arsenate, especially both the chromium arsenic.

We claim:

1. A process for the detoxification of CCA-treated wood, said process comprising the steps of:

(a) liquefying CCA-treated wood in the presence of a liquefying reagent comprising an acid and a hydroxyl-containing substance wherein said hydroxyl-containing-substance is an aliphatic hydroxyl-containing substance or an aromatic hydroxyl-containing substance and wherein said acid is selected from the group consisting of sulfuric acid, phosphoric acid, hydrochloric acid, oxalic acid, toluene sulfonic acid, phenol sulfonic acid and mixtures thereof, said acid being from about 0.1% to about 20% by weight based on the dry weight of CCA-treated wood at a temperature and for a, time sufficient to form liquefied CCA-treated wood;

(b) diluting the liquefied CCA-treated wood with water or an aqueous solution of an organic solvent to form an aqueous solution of liquefied CCA-treated wood;

(c) adding to said aqueous solution of liquefied CCA-treated wood at least one heavy metal precipitating or complexing agent, thereby precipitating from said aqueous solution of liquefied CCA-treated wood insoluble heavy metal precipitates or complexes and forming a solution of detoxified CCA-treated wood;

(d) separating the insoluble heavy metal precipitates or complexes from the solution of detoxified CCA-treated wood; and (e) isolating chromated copper arsenate from said insoluble heavy metal precipitates or complexes of step (d).

2. A process as claimed in claim 1 wherein said aliphatic hydroxyl-containing substance is a polyhydroxl substance selected from the group consisting of a polyether polyol, a polyester polyol and mixtures thereof.

3. A process as claimed in claim 1 wherein said aliphatic hydroxyl-containing substance is a mixture of gylcerol and polyethylene glycol having an average molecular weight from about 200 to about 1500.

4. A process as claimed in claim 3 wherein the amount of glycerol in the mixture of glycerol and polyethylene glycol is from about 2% to about 50% by weight.

5. A process as claimed in claim 1 wherein the aliphatic hydroxyl-containing substance is a mixture of ethylene glycol and polyethylene glycol having an average molecular weight from about 200 to about 1500.

6. A process as claimed in claim 5 wherein the amount of ethylene glycol in the mixture of ethylene glycol and polyethylene glycol is from about 2% to about 50% by weight.

7. A process as claimed in claim 1 wherein a cyclic-ester is added together with the aliphatic hydroxyl-containing substance in the step (a) to form said liquefied CCA-treated wood.

8. A process as claimed in claim 1 wherein the said aromatic-containing substance is phenol.

9. A process as claimed in claim 1 wherein ferrous ions are present in step (a).

10. A process as claimed in claim 1 wherein phosphoric acid is present in step (a).

11. A process as claimed in claim 10 wherein the concentration of phosphoric acid is from about 1% to about 10% by weight based on the amount of CCA-treated wood.

12. A process as claimed in claim 1 wherein said liquefied CCA-treated wood in step (b) is diluted with water, or an aqueous solution of methanol or acetone.

* * * * *